A. WINTHER.
DIFFERENTIAL DRIVE MECHANISM.
APPLICATION FILED OCT. 22, 1919.

1,351,084.

Patented Aug. 31, 1920.
5 SHEETS—SHEET 1.

Inventor
Anthony Winther

A. WINTHER.
DIFFERENTIAL DRIVE MECHANISM.
APPLICATION FILED OCT. 22, 1919.

1,351,084.

Patented Aug. 31, 1920.
5 SHEETS—SHEET 2.

Inventor
Anthony Winther

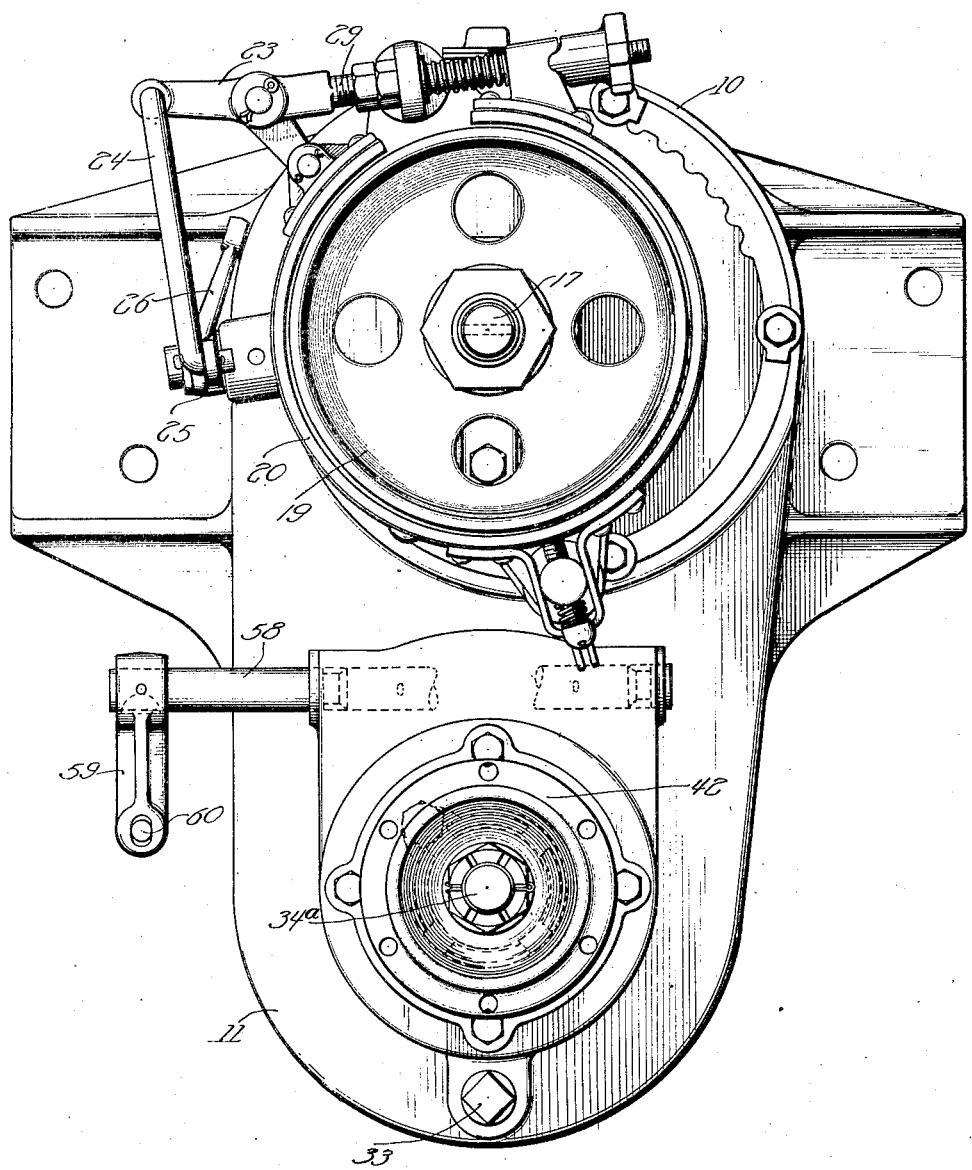

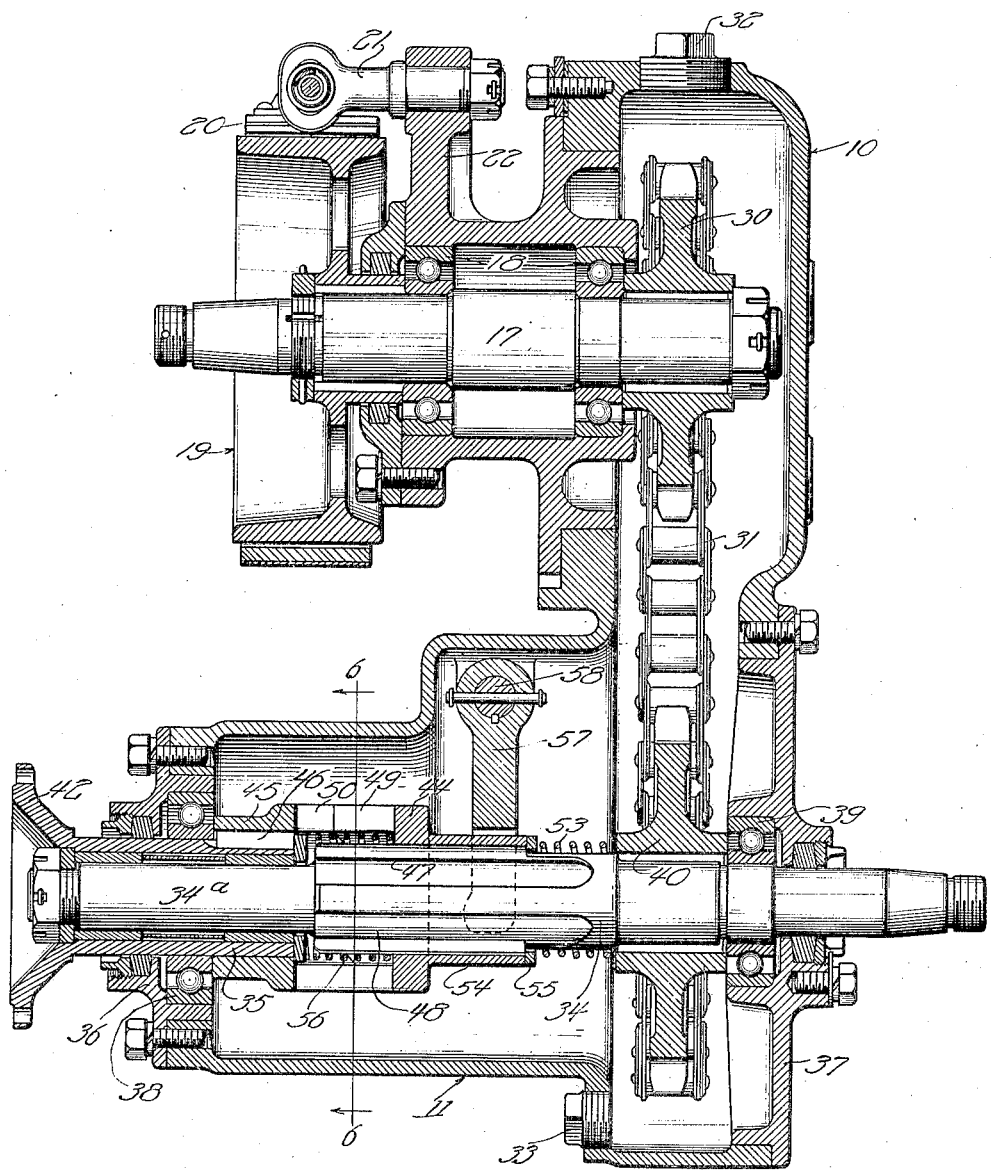

A. WINTHER.
DIFFERENTIAL DRIVE MECHANISM.
APPLICATION FILED OCT. 22, 1919.
1,351,084.
Patented Aug. 31, 1920.
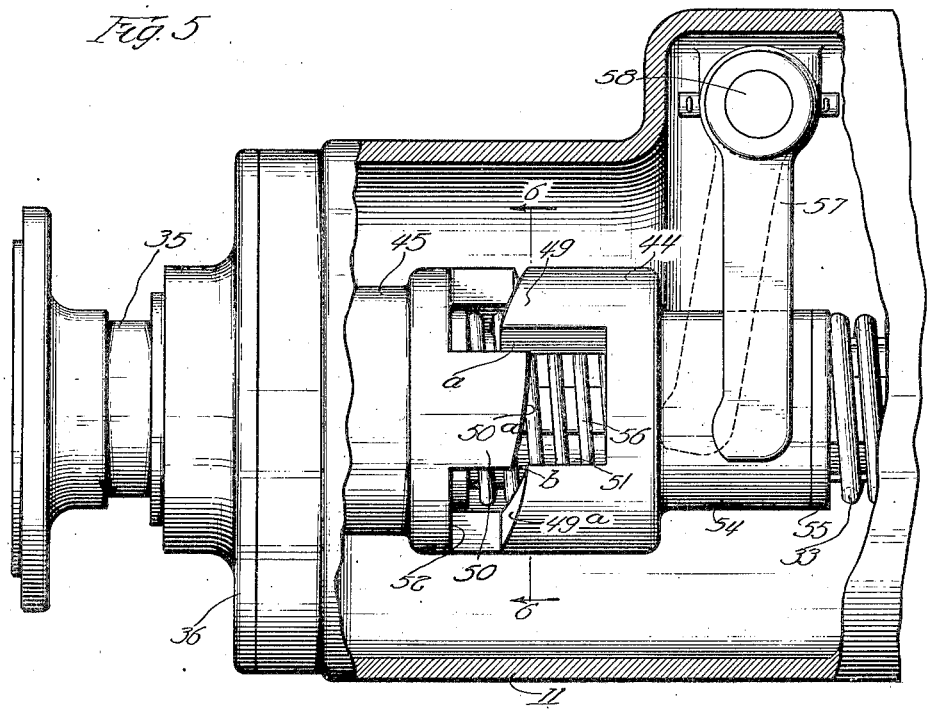
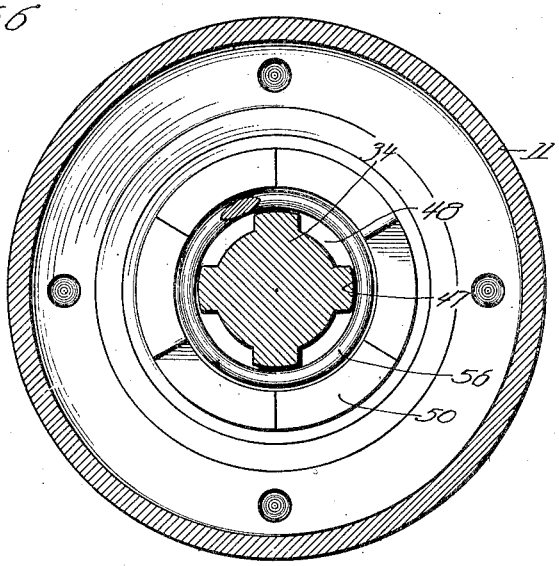
Inventor
Anthony Winther
Offield & Poole
Attys.

UNITED STATES PATENT OFFICE.

ANTHONY WINTHER, OF KENOSHA, WISCONSIN, ASSIGNOR TO MARWIN TRUCK CORPORATION, OF KENOSHA, WISCONSIN, A CORPORATION OF DELAWARE.

DIFFERENTIAL-DRIVE MECHANISM.

1,351,084.     Specification of Letters Patent.     Patented Aug. 31, 1920.

Application filed October 22, 1919. Serial No. 332,494.

*To all whom it may concern:*

Be it known that I, ANTHONY WINTHER, a citizen of the United States, and a resident of Kenosha, in the county of Kenosha and State of Wisconsin, have invented certain new and useful Improvements in Differential-Drive Mechanism.

This invention relates to improvements in vehicle driving mechanism and more particularly to a differential mechanism adapted for use with motor vehicles or trucks in which the power is delivered to both front and rear wheels or, in other words, all of the wheels are driving wheels.

The object of the invention is to provide a device or mechanism designed to be placed preferably intermediate the main drive shaft and propeller shaft for the purpose of compensating for the unequal speeds of the front and rear wheels under certain operating conditions analogous to the conditions present in the case of wheels on the same axle which demand the presence of the usual "differential" to be found in all motor vehicles which compensates for the increased speed of rotation of the outermost wheel when the vehicle is traveling in a curvilinear path, as when turning a corner. For similar reasons it is desirable to provide means in the so-called four wheel drive type of vehicle, to compensate for the varying speed of rotation between the pairs of front and rear wheels. It is proposed, therefore, to provide a construction of a mechanism of this character which will accomplish the desired purpose in the simplest and most efficient manner. The novel features of the invention are hereinafter fully set forth and illustrated in the accompanying drawings in which—

Figure 1:
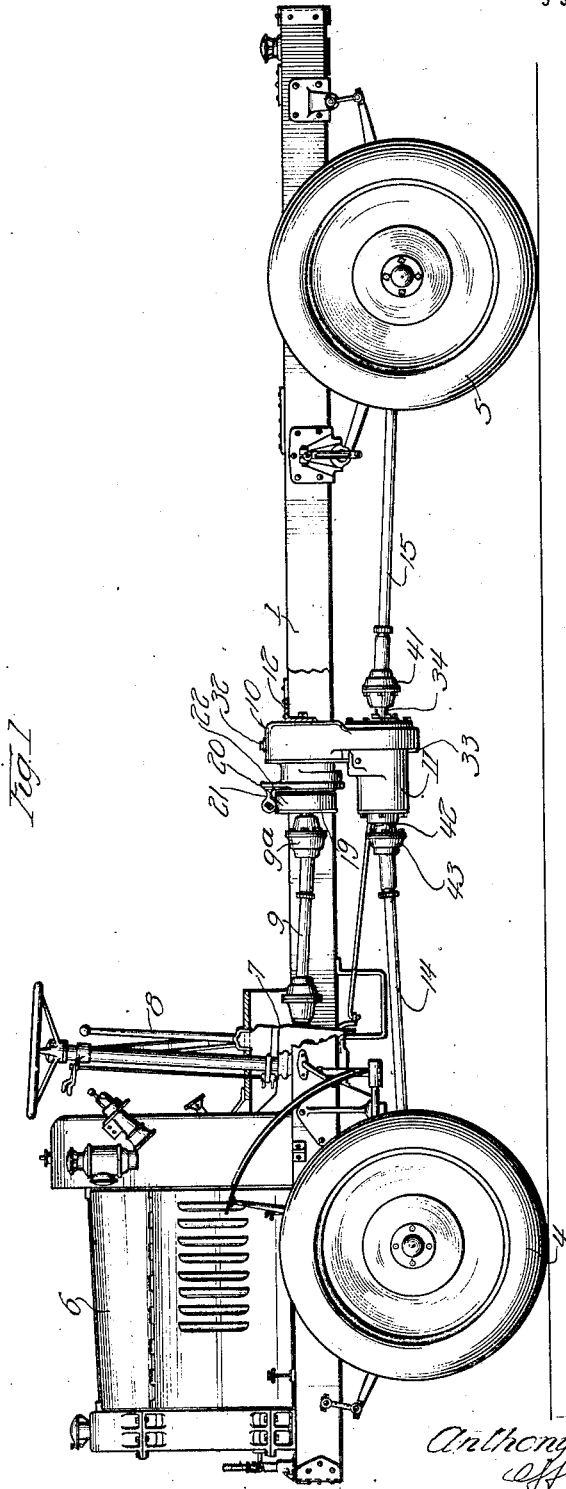
Figure 2:
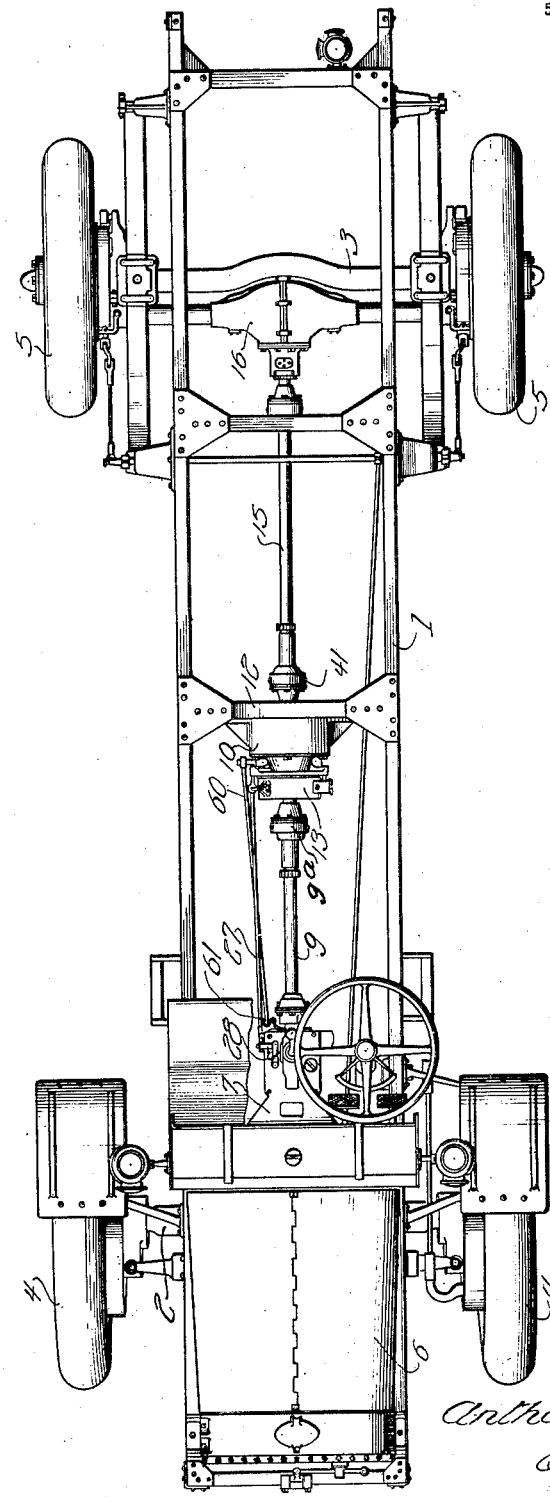

Figure 1 is a view in side elevation of the chassis of a vehicle equipped with the devices embodying the features of the invention, Fig. 2 is a top plan view of the chassis shown in Fig. 1, Fig. 3 is an enlarged end view of the casing or housing of the device, Fig. 4 is a view in vertical section of the device, Fig. 5 is an enlarged detail view of the clutch mechanism of the device, and Fig. 6 is a detail cross sectional view taken on line 6—6 of Fig. 5.

The device is herein illustrated as a part of a chassis of a motor truck, the same comprising the usual parts, namely, the frame 1, including the front and rear axles 2 and 3, respectively, with the front and rear wheels 4, 4 and 5, 5 mounted thereon, a hood 6 which incloses the motor, a transmission casing 7 provided with a gear shifting lever 8, and a main drive shaft 9 extending rearwardly from the transmission casing 7.

The device or differential mechanism embodying the features of the invention is preferably located at the central part of the chassis, midway between the front and rear axles, the same being generally indicated in Figs. 1 and 2 as a casing having the appearance of two connected housings 10 and 11 disposed one above the other, the upper housing or casing section 10 being fixed to the central transverse frame member 12 of the chassis frame 1 and the under housing 11 depending below the frame. The main drive shaft 9 terminates in the upper casing 10 and in connection with the mechanism contained therein, there being preferably provided a brake mechanism 13 immediately adjacent the end of said drive shaft, as will hereinafter be described. Extending from the front and rear ends of the lower casing 11 are the front and rear propeller shafts 14 and 15, respectively, said shafts being connected with the front axle (not shown) and rear axle differentials 16, respectively, through which the power is delivered to the wheels in the usual manner.

Referring now more in detail to the device, Figs. 4, 5 and 6, within the upper casing 10 (Fig. 4) is a horizontal rotative shaft 17 mounted in anti-friction bearings. The shaft 17, which may be called the primary driven shaft of the device, projects from one end (the front end) of the casing and is fixed by means of a suitable joint or flexible coupling 9ª (Figs. 1 and 2) to the main drive shaft 9. Keyed to the shaft 17 just exterior of the casing is a brake drum 19 which is surrounded by a brake band 20 of the contracting type, the latter being supported by a bracket 21 supported by an integral arm 22 of the casing. The usual form of brake operating members are employed, namely, a bell crank lever 23 (Fig. 3) connected at one end with the adjacent end of the brake band and at its other end with a link 24 connected to another bell crank lever 25, the vertical arm 26 thereof being joined to a rod 27 (Fig. 2) extending forwardly to a brake lever 28 mounted on the transmission housing 9 adjacent the driver's seat. A yieldable and adjustable link 29 connects the central point or fulcrum of the bell crank lever 23 with the opposite end of the brake band 20.

At the inner end of the shaft 17 is mounted a sprocket wheel 30 on which is carried a sprocket chain 31, said chain extending downwardly into the lower casing 11 through a connecting passage between the two casings and is inclosed within a chamber, there being provided at the top of the casing 10 a plug 32 for the admission of oil, and at the bottom of the lower casing a drain plug 33.

Extending axially of the lower casing and in parallel relation to the shaft 17 are two shafts 34 and 35 which may be called the secondary driven shafts. The shaft 34 extends outwardly through and beyond the end plates 36 and 37 of the casing and is supported by anti-friction bearings 38 and 39 mounted in said end plates 36 and 37, respectively, though only indirectly by the bearing 38 at the forward end, as will hereinafter be pointed out. Keyed to the shaft 34 and directly below the sprocket wheel 30 of the shaft 17 is a sprocket wheel 40 of slightly larger pitch diameter than said sprocket wheel 30. This sprocket wheel engages and carries the sprocket chain 31, thus providing a positive chain drive between the primary driven shaft 17 and the secondary driven shaft 34. The end of said shaft adjacent to its sprocket wheel 40 has direct connection with the rear propeller shaft 15 by means of a suitable flexible coupling 41, Figs. 1 and 2, and hence it is obvious that there is a positive drive between the main drive shaft 9 and said rear propeller shaft 15 through the intermediate elements, namely, the shaft 17, sprocket chain 31 and shaft 34.

The forward or opposite end of the shaft 34 is provided with a reduced end portion 34$^a$ upon which is mounted the shaft 35, the same being of tubular form, said shaft being rotative on the reduced end portion 34$^a$ of the shaft 34 and extending through the end plate 36 of the casing and has direct bearing engagement with the anti-friction bearing 38. The outer end of the tubular shaft 35 is provided with an integral dish-shaped member 42 which forms one part of a flexible coupling 43 joining said shaft 35 with the front propeller shaft 14, shown in Fig. 1.

Mounted in the shafts 34 and 35 are clutch members 44 and 45, respectively, said members consisting of cylindrical sleeves, the member 45 being rigidly fixed to the shaft 35 by means of the key 46, whereas the member 44 is mounted on the shaft 34 in a manner to permit the same to be moved endwise on its shaft and in a direction toward and from the other clutch member 45, there being provided longitudinal grooves 47 formed in the shaft and engaging ribs 48 formed on the inner annular surface of the movable clutch member, Fig. 6. On the opposed faces of the clutch members 44 and 45 are provided series of interlocking clutch teeth 49 and 50, Fig. 5, spaced apart in a manner to form between them a series of locking recesses 51 and 52, respectively. The end surfaces 49$^a$ and 50$^a$ of the teeth 49 and 50 are preferably beveled or slightly warped in order that the following action may be obtained, namely, assuming that the shaft 34 and clutch member 44 are being rotated in a counter-clockwise direction, the teeth will be slightly interlocked to the extent that the lateral faces of two engaging teeth will have bearing contact with each other, as at $a$, Fig. 5. The end faces 49$^a$ and 50$^a$ of the teeth thus in contact are beveled or inclined from the contacting faces rearwardly toward the base of each tooth so that at the opposite sides of the teeth a space separates the same as at $b$, Fig. 5. It is obvious that so long as the clutch member 44 continues to rotate in a counter clockwise direction the other clutch member will rotate and be driven by it. However, if the clutch member 45 should rotate at a greater speed than the member 44, the beveled end faces of the teeth would come into sliding engagement with the result that a cam action is produced whereby the movable clutch member is shifted endwise and out of locking engagement with the other clutch member, the teeth passing successively over each other without effecting the locking of the same. Hence it will be seen that the shaft 34 which is positively driven in a counter-clockwise direction as indicated by the arrow, drives the shaft 35 only so long as the same is not rotated at a greater speed and that when this occurs, as will be hereinafter pointed out, the clutch members are automatically released, said clutch members remaining disengaged until the shaft 35 resumes a speed equal to or less than the shaft 34, whereupon the clutch members come into engagement again, this being accomplished automatically by the provision of a comparatively heavy coiled spring 53 which is mounted between a tubular extension 54 of the clutch member and washer 55, and the sprocket wheel 40. This spring acts to constantly force the movable clutch member 44 endwise into clutching position and opposes the cam action of the beveled end faces of the clutch teeth. In addition to the spring 53 there is provided another coiled spring 56 of less strength than the spring 53 and located between the clutch members 44 and 45, said spring acting to force the members apart, thus insuring the disengagement thereof.

Under certain conditions it is desirable to retain the clutch members in positive locking engagement and for this purpose there is provided a yoke member 57 which is fixed on a pivot rod 58 mounted in bearings formed in the casing 11 immediately above the clutch member 44. The yoke member 57 straddles the reduced sleeve portion 54 of the clutch member 44, the ends of said yoke member being adapted to bear against the rear face of said clutch member 44 when the yoke member is swung into the dotted line position shown in Fig. 5. The pivot rod 58 extends exterior of the casing and is provided with a lever 59, Fig. 3, to the end of which is connected a rod 60 extending forwardly to an operating lever 61 adjacent to the operator's seat, Fig. 2. In this manner a positive driving connection can be established between the shafts 34 and 35 through the medium of the clutch members when the driving conditions so warrant.

In order to understand the function and operation of the device, it is to be borne in mind that when a vehicle is being driven in a straight path the speed of the front and rear wheels is obviously equal. On the other hand, when the vehicle is driven in a circular path, as when turning a corner, the tendency is for the front wheels to describe a comparatively wide arc, inasmuch as their path is defined by the angle of turning of the steering mechanism. The rear wheels, however, while following the front wheels, are not ordinarily steered but are "pulled around" after the front wheels, with the result that they describe a smaller arc than the front wheels, that is, they "cut" the corner. This being the case, the speed of rotation of the front wheels is increased, whereas the speed of the rear wheels is diminished. A vehicle in which the power is delivered to the front and rear axle from the same driving shaft requires a differential or compensating device in order to overcome the difference in rotative speed of the front and rear wheels and to eliminate the strains that would accompany the uneven distribution of power that would otherwise result. In the present device this is accomplished by providing a mechanism located between the main drive shaft and the front and rear propeller shafts and so constructed that the rear wheels are in positive driving connection with the main drive shaft and the front wheels or front propeller shaft is driven from the rear propeller shaft there being provided the clutch mechanism which permits the front wheels to exceed the speed of the rear wheels by automatically disengaging the two propeller shafts during the period of the increased speed of the front propeller shaft, and likewise, automatically effecting the engagement of the propeller shafts when the same resume the same speed of rotation. Under some conditions of operation where the maximum tractive effort is required, and in spite of the difference that may exist in the speed of the propeller shafts, it is desirable to lock the propeller shafts to insure the power being delivered to all of the wheels. The lever operated yoke mechanism or locking member is provided for this purpose as well as for insuring the engagement of the clutch members when reversing the direction of the shafts as in backing the vehicle, particularly under conditions where the maximum tractive effort is required.

The features embodied in my invention may obviously be modified without departing from the spirit of the invention and for this reason I do not wish to be limited except insofar as specifically pointed out in the appended claims.

I claim as my invention:

1. In a device of the character described, the combination of a primary driven shaft, a plurality of secondary driven shafts, one of said secondary shafts having positive driving connection with said primary driven shaft and normally in driving connection with the other of said secondary shafts, clutch members interposed between said secondary driven shafts and adapted to automatically disengage the last mentioned secondary shaft when the speed of rotation thereof exceeds the speed of rotation of the positively driven secondary shaft.

2. In a device of the character described, the combination of a primary driven shaft, a plurality of secondary driven shafts in driving connection with separate vehicle driving gears, one of said secondary shafts having positive driving connection with said primary driven shaft, interlocking clutch members mounted on said secondary shafts acting normally to transmit power from said positively driven shaft to the other secondary shaft, said clutch members being arranged to be automatically released when the speed of said last mentioned secondary shaft exceeds the speed of the positively driven secondary shaft.

3. In a device of the character described, the combination of a primary driven shaft, a plurality of secondary driven shafts arranged in axial alinement and in driving connection with separate driving units, means for positively connecting said primary driven shaft with one of said secondary driven shafts, clutch members connecting said positively driven secondary shaft and the other secondary shaft and comprising clutch teeth having interlocking engagement, said teeth being formed to permit said secondary shafts to be automatically disengaged when the speed of rotation of the last mentioned secondary shaft exceeds the speed of rotation of said positively driven shaft.

4. In a device of the character described, the combination of a primary driven shaft, a plurality of secondary driven shafts, one of said shafts having positive driving connection with said primary driven shaft, clutch members mounted on each of said secondary shafts, one of said clutch members being endwise movable on its shaft, said clutch members being provided with interlocking clutch teeth having beveled end faces arranged to effect the automatic endwise movement of said movable clutch member out of clutching engagement, when the speed of rotation of said positively driven secondary shaft is less than the speed of the other of said shafts.

5. In a device of the character described, the combination of a primary driven shaft, a plurality of secondary driven shafts, one of said secondary shafts having positive driving connection with said primary driven shaft, clutch mechanism interposed between said positively driven secondary shaft and the other secondary shaft comprising clutch members arranged to become automatically disengaged when the speed of the last mentioned secondary driven shaft exceeds the speed of the positively driven secondary shaft, and means for locking said clutch members from disengagement.

6. In a device of the character described, the combination of a primary driven shaft, a plurality of secondary shafts, one of the same having positive driving connection with said primary driven shaft, clutch members mounted on said secondary shafts and normally adapted to have clutching engagement and capable of being automatically disengaged when the speed of rotation of one of said shafts exceeds the speed of rotation of the other of said shafts, a comparatively heavy spring opposing the disengagement of said clutch members, a comparatively light spring acting to aid the disengagement, and a manually operable member acting to hold said clutch members in clutching engagement.

7. In a motor vehicle, the combination of a motor, a main drive shaft and propeller shafts in driving connection with the front and rear wheels of the vehicle, means for positively connecting one of said propeller shafts to said main driven shaft, and clutch mechanism interposed between said propeller shafts for transmitting power from one to the other and acting automatically to permit one of said propeller shafts to rotate freely and at a greater speed than the other of said propeller shafts.

8. In a motor vehicle, the combination of a motor, a main drive shaft, propeller shafts in driving connection with the front and rear wheels, said rear propeller shafts having positive driving connection with said main drive shaft, clutch mechanism interposed between said front and rear propeller shafts and operating automatically to disengage said front propeller shaft to permit the same to rotate freely and at a greater speed than the rear propeller shaft.

9. In a motor vehicle, the combination of a motor, a main drive shaft, propeller shafts in driving connection with the front and rear wheels, a differential mechanism intermediate the front and rear propeller shafts comprising a casing, a primary shaft mounted in said casing having driving connection with said main drive shaft, a plurality of secondary shafts each having driving connection with said propeller shafts, one of said secondary shafts having positive driving connection with said primary shaft, and clutch mechanism interposed between said secondary shafts and normally acting to transmit power from said positively driven secondary shaft to the other secondary shaft and acting automatically to disconnect said secondary shafts to permit said last mentioned secondary shaft to rotate freely and at a greater speed than the positively driven secondary shaft.

10. In a motor vehicle, the combination of a main drive shaft and propeller shafts in driving connection with the front and rear wheels, a differential mechanism interposed between said main drive shaft and said propeller shafts and comprising a casing embracing the free ends of said shafts, means within said casing for positively connecting said main driving shaft to the rear wheel propeller shaft, and clutch mechanism interposed between said propeller shaft, said clutch mechanism acting automatically to disengage said propeller shafts when the speed of rotation of the front wheel propeller shaft exceeds the speed of the rear wheel propeller shaft.

11. In a motor vehicle, the combination of a main drive shaft, front and rear wheel propeller shafts, and a differential mechanism interposed between said drive shaft and propeller shafts comprising a positive gear drive connecting said main drive shaft and rear wheel propeller shaft, clutch mechanism intermediate said propeller shafts, means automatically disengaging said clutch members when the speed of said front wheel propeller shaft exceeds the speed of the rear propeller shaft, and manually operable means for locking said clutch members together.

In witness whereof I have hereunto subscribed my name this 8th day of October, A. D. 1919.

ANTHONY WINTHER.